United States Patent
Janssens et al.

[11] Patent Number: 5,246,908
[45] Date of Patent: Sep. 21, 1993

[54] DYES FOR USE IN THERMAL DYE TRANSFER

[75] Inventors: Wilhelmus Janssens, Aarschot; Luc J. Vanmaele, Lochristi, both of Belgium

[73] Assignee: AGFA-Gevaert, N.V., Mortsel, Belgium

[21] Appl. No.: 789,674

[22] Filed: Nov. 8, 1991

[30] Foreign Application Priority Data

Nov. 14, 1990 [EP] European Pat. Off. ........ 90203014.7

[51] Int. Cl.$^5$ ...................... B41M 5/035; B41M 5/38
[52] U.S. Cl. .................... 503/227; 428/195; 428/420; 428/500; 428/532; 428/913; 428/914
[58] Field of Search .................. 8/471; 428/195, 913, 428/914, 480, 500, 532; 503/227

[56] References Cited

U.S. PATENT DOCUMENTS 4,764,178 8/1988 Gregory et al. .................. 8/471

Primary Examiner—Bruce H. Hess
Attorney, Agent, or Firm—Breiner & Breiner

[57] ABSTRACT

Dye-donor element for use according to thermal dye transfer methods comprising a support having thereon a dye/binder layer comprising a dye carried by a polymeric binder resin, said dye corresponding to the following general formula

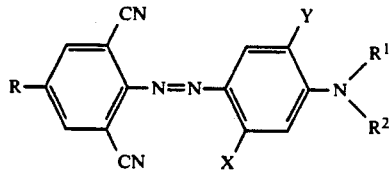

wherein
R represents a hydrogen atom, a $C_1$–$C_8$ alkyl group, a $C_1$–$C_8$ alkoxy group, a $C_3$–$C_8$ alkoxyalkyl group or a halogen atom;
$R^1$ and $R^2$ (same or different) represent a $C_1$–$C_8$ alkyl group, a substituted $C_1$–$C_8$ alkyl group, a cycloalkyl group, a substituted cycloalkyl group, an aryl group, a substituted aryl group, or $R^1$ and $R^2$ together represent the atoms necessary for completing a heterocyclic nucleus or substituted heterocyclic nucleus, or $R^1$ and/or $R^2$ together with Y represent the atoms necessary for completing a fused-on heterocyclic nucleus or substituted fused-on heterocyclic nucleus;
Y represents a hydrogen atom, a methyl group, a halogen atom, a $C_1$–$C_4$ alkoxy group, or Y together with $R^1$ and/or $R^2$ represent the atoms necessary for completing a fused-on heterocyclic nucleus or substituted fused-on heterocyclic nucleus;
X represents a substituted or unsubstituted arylsulfonylamino group, a substituted or unsubstituted arylcarbonylamino group or a substituted or unsubstituted phosphorylamino group.

10 Claims, No Drawings

DYES FOR USE IN THERMAL DYE TRANSFER

The present invention relates to dye-donor elements for use according to thermal dye sublimation transfer methods and to novel dyes for use in said dye-donor elements.

Thermal dye sublimation transfer methods, also called thermal dye diffusion transfer methods, have been developed to make prints from electronic pattern information signals e.g. from pictures that have been generated electronically by means of a colour video camera. To make such prints the electronic picture can be subjected to colour separation with the aid of colour filters. The different colour selections thus obtained can then be converted into electric signals, which can be processed to form cyan, magenta, and yellow electrical signals. The resulting electrical colour signals can then be transmitted to a thermal printer. To make the print a dye-donor element having repeated separate blocks of cyan, magenta, and yellow dye is placed in face-to-face contact with a receiving sheet and the resulting sandwich is inserted between a thermal printing head and a platen roller. The thermal printing head, which is provided with a plurality of juxtaposed heat-generating resistors, can selectively supply heat to the back of the dye-donor element. For that purpose it is heated up sequentially in correspondence with the cyan, magenta, and yellow electrical signals, so that dye from the selectively heated regions of the dye-donor element is transferred to the receiver sheet and forms a pattern thereon, the shape and density of which are in accordance with the pattern and intensity of the heat supplied to the dye-donor element.

A dye-donor element for use according to thermal dye sublimation transfer methods usually comprises a very thin support e.g. a polyester support, which is coated on both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye/binder layer, which contains the printing dyes in a form that can be released in varying amounts depending on, as mentioned above, how much heat is applied to the dye-donor element.

The dye/binder layer can be a monochrome dye layer or it may comprise sequential repeated separate blocks of different dyes like e.g. cyan, magenta, and yellow dyes. When a dye-donor element comprising three or more primary colour dyes is used, a multicolour image can be obtained by sequentially performing the dye transfer process steps for each colour.

The dye/binder layer comprising said repeated separate blocks of cyan, magenta and yellow dye can be coated from a solution in appropriate solvents on the subbed support, but the known coating techniques are not quite adapted to the discontinuous repeated coating of three differently coloured dye/binder areas on said very thin support. It is therefore customary, especially in large-scale manufacturing conditions, to print said dye/binder layer on said support by printing techniques such as a gravure process.

In order to make possible an easy printing of the dye/binder composition on the support, this composition should comprise a good solvent and preferably an ecologically harmless solvent to give it a printable ink-like nature.

The 2,6-di-cyano-substituted arylazoaniline magenta dyes described in JP 86/227092 have a favourable stability to light and a good hue, but they have the important drawback of having a solubility in common solvents like acetone, ethyl methyl ketone, and ethyl acetate that is too poor for being usable in the large-scale production of dye-donor elements according to the customary gravure printing techniques. The dyes should have a better solubility i.e. a solubility of at least 6% by weight. Because of this low solubility the maximum dye/binder concentration in which these dyes can be printed is too low leading to transferred densities that are too low.

These dyes are sufficiently soluble and can be gravure printed from chlorinated hydrocarbon solvents such as methylene chloride, ethylene dichloride and 1,1,2-trichloroethane. However, from an ecological standpoint these chlorinated hydrocarbon solvents are being rejected nowadays and their recovery from a hot airstream used for drying the printed dye-donor element requires difficult and expensive techniques.

It is therefore an object of the present invention to provide a dye-donor element comprising in the dye/binder layer a magenta dye that in addition to having a favourable stability to light and a good hue also has a satisfactory solubility in ecologically harmless solvents.

This and other objects are achieved by providing a dye-donor element for use according to thermal dye transfer methods, said element comprising a support having thereon a dye/binder layer comprising a dye carried by a polymeric binder resin, characterized in that said dye corresponds to the following general formula

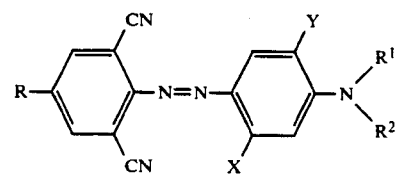

wherein
- R represents a hydrogen atom, a $C_1$-$C_8$ alkyl group, a $C_1$-$C_8$ alkoxy group, a $C_3$-$C_8$ alkoxyalkyl group or a halogen atom;
- $R^1$ and $R^2$ (same or different) represent a $C_1$-$C_8$ alkyl group, a substituted $C_1$-$C_8$ alkyl group e.g. an aralkyl group or a hydroxyalkyl group, a cycloalkyl group, a substituted cycloalkyl group, an aryl group, a substituted aryl group, or $R^1$ and $R^2$ together represent the atoms necessary for completing a heterocyclic nucleus or substituted heterocyclic nucleus, or $R^1$ and/or $R^2$ together with Y represent the atoms necessary for completing a fused-on heterocyclic nucleus or substituted fused-on heterocyclic nucleus;
- Y represents a hydrogen atom, a methyl group, a halogen atom, a $C_1$-$C_4$ alkoxy group, or Y together with $R^1$ and/or $R^2$ represent the atoms necessary for completing a fused-on heterocyclic nucleus or substituted fused-on heterocyclic nucleus;
- X represents a substituted or unsubstituted arylsulfonylamino group, a substituted or unsubstituted arylcarbonylamino group or a substituted or unsubstituted phosphorylamino group.

Using arylsulfonylamino groups or arylcarbonylamino groups or phosphorylamino groups at the X position instead of the alkylsulfonylamino or alkylcarbonylamino groups as described in JP 86/227 092 leads to a higher solubility in ecologically harmless solvents because of the larger possibilities to adapt the properties of the dyes by changing the substitution on the aryl group of the arylsulfonylamino or arylcarbonylamino group, respectively the substitution of the phosphorylamino group. Furthermore, a lot of arylsulfonylchlorides or arylcarbonylchlorides are commercially available or can be more easily synthesized than the aliphatic ones.

According to an embodiment of the present invention the present dyes, in which X stands for arylsulfonylamino, correspond to the following general formula I

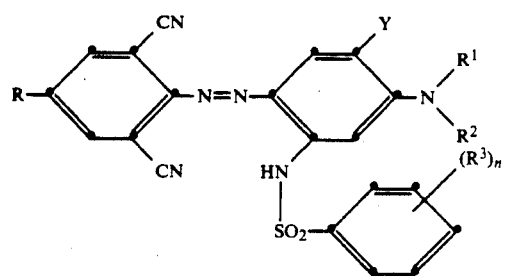

wherein
R,$R^1$,$R^2$ and Y each have one of the significances given hereinbefore for these symbols;
$R^3$ represents hydrogen, halogen, cyano, nitro, a substituted or unsubstituted alkyl or alkoxy group having from 1 to 10 carbon atoms, a cycloalkyl group having from 5 to 7 carbon atoms, a substituted or unsubstituted aryl or aryloxy group having from 6 to 10 carbon atoms, alkyl- or arylcarbonyl, alkyl- or arylthio, alkyl- or arylsulfonyl, alkyl- or aryloxycarbonyl, alkyl- or arylaminocarbonyl, alkyl- or arylcarbonylamino, alkyl- or arylsulfonylamino;
n represents an integer from 0 to 5.

Representative examples of dyes corresponding to general formula I are listed in the following Table 1, the symbols used therein referring to the above formula I.

TABLE 1

| Dye No. | R | $R^1$ | $R^2$ | Y | n | $R^3$ |
|---|---|---|---|---|---|---|
| I.1 | $CH_3$ | $C_4H_9$ | $C_4H_9$ | H | 0 | |
| I.2 | $CH_3$ | $C_4H_9$ | $C_4H_9$ | H | 1 | 4-$CH_3$ |
| I.3 | $CH_3$ | $C_2H_5$ | $C_2H_5$ | H | 1 | 4-$CH_3$ |
| I.4 | $CH_3$ | $C_4H_9$ | $C_4H_9$ | H | 1 | 2-$NO_2$ |
| I.5 | $CH_3$ | $C_4H_9$ | $C_4H_9$ | H | 1 | 3-$NO_2$ |
| I.6 | $CH_3$ | $C_4H_9$ | $C_4H_9$ | H | 1 | 4-$NO_2$ |
| I.7 | $CH_3$ | $C_4H_9$ | $C_4H_9$ | H | 1 | 4-Cl |
| I.8 | $CH_3$ | $C_4H_9$ | $C_4H_9$ | H | 1 | 4-$NHCOCH_3$ |
| I.9 | $CH_3$ | $C_4H_9$ | $C_4H_9$ | H | 2 | 2-Cl; 5-Cl |

According to another embodiment of the present invention the present dyes, in which X stands for arylcarbonylamino, correspond to the following general formula II

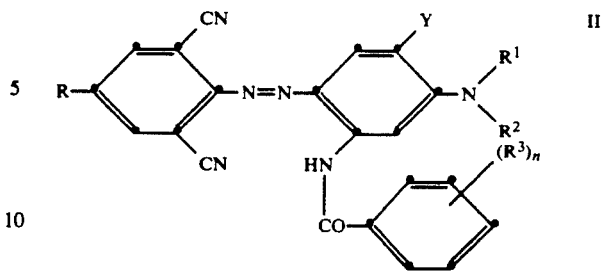

wherein R,$R^1$,$R^2$,Y,$R^3$ and n each have one of the significances given hereinbefore for these symbols.

Representative examples of dyes corresponding to general formula II are listed in the following Table 2, the symbols used therein referring to the above formula II.

TABLE 2

| Dye No. | R | $R^1$ | $R^2$ | Y | n | $R^3$ |
|---|---|---|---|---|---|---|
| II.1 | $CH_3$ | $C_4H_9$ | $C_4H_9$ | H | 0 | |
| II.2 | $CH_3$ | $C_4H_9$ | $C_4H_9$ | H | 1 | 4-$NO_2$ |
| II.3 | $CH_3$ | $C_4H_9$ | $C_4H_9$ | H | 1 | 3-$CH_3$ |
| II.4 | $CH_3$ | $C_4H_9$ | $C_4H_9$ | H | 1 | 2-Cl |
| II.5 | $CH_3$ | $C_4H_9$ | $C_4H_9$ | H | 1 | 4-Cl |
| II.6 | $CH_3$ | $C_4H_9$ | $C_4H_9$ | H | 1 | 4-$OCH_3$ |

According to another embodiment of the present invention the present dyes, in which X stands for phosphorylamino, correspond to the following general formula III

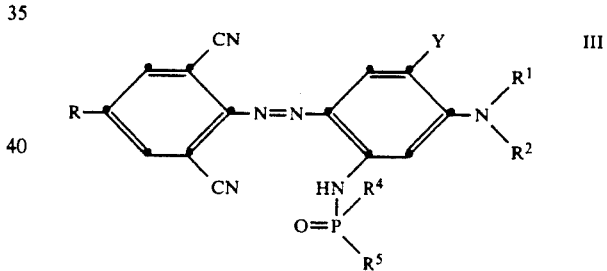

wherein
R, $R^1$, $R^2$ and Y each have one of the significances given hereinbefore for these symbols;
$R^4$ and $R^5$ (same or different) represent a substituted or unsubstituted alkyl or aryl group, a substituted or unsubstituted alkoxy or aryloxy group, a substituted or unsubstituted amino group.

Representative examples of dyes corresponding to general formula III are listed in table 3, the symbols used therein referring to the above formula III.

TABLE 3

| Dye No. | R | $R^1$ | $R^2$ | Y | $R^4$ | $R^5$ |
|---|---|---|---|---|---|---|
| III.1 | $CH_3$ | $C_4H_9$ | $C_4H_9$ | H | $OC_6H_5$ | $OC_6H_5$ |
| III.2 | $CH_3$ | $C_4H_9$ | $C_4H_9$ | H | $OC_2H_5$ | $OC_2H_5$ |

The dyes of the present invention can be prepared according to standard synthetic procedures known to those skilled in the art of organic synthesis. By way of example the synthesis of dye I.2 is described hereinafter; the synthesis is outlined in scheme 1.

Scheme 1

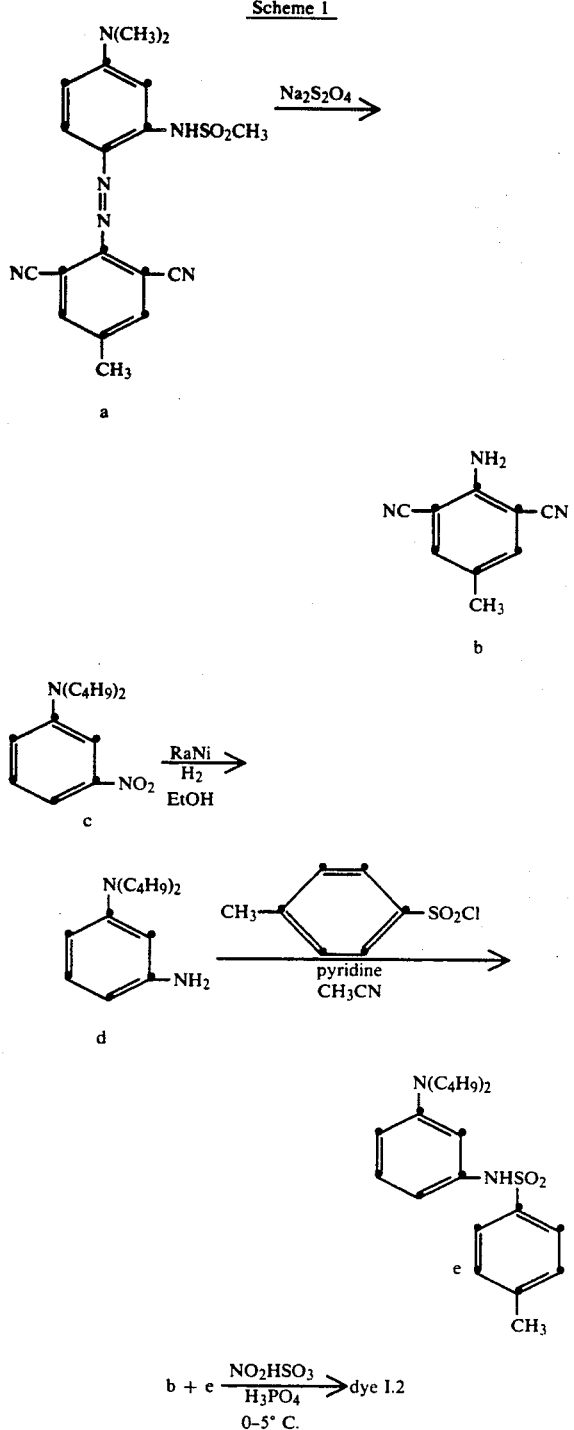

Synthesis of Compound b

A solution of compound a (Resolin Rot F3BS supplied by Bayer AG, Leverkusen, Germany) (220 gr, 0.5 mol) and $Na_2S_2O_4$ (522 g) in ethylacetate (1100 ml) and water (1980 ml) is refluxed for 45 minutes. The reaction mixture is then filtered and the water layer is extracted with ethylacetate (4×250 ml). The combined organic layers are washed with 1 N HCl till pH=2, with $NaHCO_3$ till neutral and with a saturated NaCl solution. The solution is dried on $Na_2SO_4$, filtered and concentrated under reduced pressure. Compound b is purified by boiling in methanol (Yield=70%).

Synthesis of Compound e

Compound c (31.5 g, 0.127 mol) is dissolved in 280 ml of ethanol. 3 ml of RaNi is added. The solution is put under hydrogen pressure (75 bar) and heated at 80° C. for 75 minutes. Then, the catalyst is filtered and the solution concentrated under reduced pressure; the resulting oil (yield=98%) is dissolved in acetonitrile and 12 ml of pyridine and 28.6 g of tosylchloride are added. The solution is heated at 83° C. for 1 hour. Then, the solution is poured out on a mixture of 0.1 N HCl and ice. The supernatant is removed and the oily residue is crystallized from 100 ml acetonitrile. Yield: 34 g (62%). Melting point=170° C.

Synthesis of Dye I.2

2 gr of compound b is dissolved in 12.5 g phosphoric acid and cooled to 0° C. A solution of nitrosyl sulfuric acid is slowly added at 0°-5° C. and stirring is continued for 35 minutes (solution A).

4,3 g of compound e is dissolved in 50 ml of sulfuric acid (5%) and 60 ml of tetrahydrofuran. The solution is cooled to 0°-5° C. (solution B).

Solution A is slowly added to solution B at 0°-5° C. and stirring is continued for 30 minutes. The precipitate is filtered, washed with water and dried at 50° C. The compound is purified by crystallization from acetonitrile (melting point: 174° C.) and 3 gr. of dye I.2 are obtained.

All other compounds mentioned in table 1, table 2 and table 3 can be prepared analogously, provided the appropriate acid chloride is used.

These dyes can also be prepared by coupling instead of the dicyano aniline (corresponding to compound b above) the appropriate dibromo aniline to the appropriate amine (corresponding to compound e above) to obtain the corresponding dibromo dyes which are thereafter substituted with cyanide ion, e.g. with CuCN and $Zn(CN)_2$.

The dyes of the present invention have a magenta hue.

Absorption maxima ($\lambda_{max}$) and molar extinction coefficients ($\epsilon$) measured in methanol, of these dyes are listed in table 4.

TABLE 4

| Dye No. | $\lambda_{max}$ | $\epsilon_{max}$ (1 mol$^{-1}$ cm$^{-1}$) |
| --- | --- | --- |
| I.1 | 523 nm | 45769 |
| I.2 | 532 nm (*) | 45789 |
| I.3 | 529 nm (*) | 41221 |
| I.4 | 519 nm (*) | 27082 |
| I.5 | 525 nm | 30981 |
| I.6 | 525 nm | 41578 |
| I.7 | 524 nm | 45663 |
| I.8 | 523 nm | 43940 |
| I.9 | 522 nm | 44632 |
| II.1 | 523 nm | 42423 |
| II.2 | 527 nm | 42638 |
| II.3 | 523 nm | 42909 |
| II.4 | 532 nm (*) | 49346 |
| II.5 | 525 nm | 43213 |
| II.6 | 523 nm | 39923 |
| III.1 | 523 nm | 43216 |
| III.2 | 521 nm | 43508 |

(*) A mixture of $CH_3OH$ and $CH_2Cl_2$ (1:1) was used instead of $CH_3OH$.

The dyes of the present invention can be used in any thermal dye transfer method according to which printing dyes can be released by fusion, vapourization, or sublimation. They can be used in inks e.g. for laser applications and for inkjet. They can further be employed in a layer making part of a photographic material comprising at least one light-sensitive silver halide emulsion layer or in non-photographic materials such as in textile, varnishes, lacquers, paints, synthetic materials, and in glass. They can also find an application in resistive ribbon printing processes. A survey of resistive ribbon printing has been given in J. Imaging Technology, Vol. 12, No. 2, April 1986, page 100–110. A resistive sublimation ribbon that can be used in combination with the dyes used according to the present invention has been described in the Research Disclosure 29442 (October 1988) page 769.

According to the most important embodiment of the present invention the dyes are used in the dye/binder layer of a dye-donor element for thermal dye sublimation transfer.

The dye/binder layer of a dye-donor element for thermal dye sublimation transfer is formed preferably by adding the dyes, the binder resin, and other optional components to a suitable solvent or solvent mixture, dissolving or dispersing the ingredients to form a composition that is applied to a support, which may have been provided first with an adhesive layer, and dried.

The dye/binder layer thus formed has a thickness of about 0.2 to 5.0 $\mu$m, preferably 0.4 to 2.0 $\mu$m, and the amount ratio of dye to binder is from 9:1 to 1:3 by weight, preferably from 2:1 to 1:2 by weight.

The binder resin can be chosen from cellulose derivatives like ethyl cellulose, hydroxyethyl cellulose, ethylhydroxy cellulose, ethylhydroxyethyl cellulose, hydroxypropyl cellulose, methyl cellulose, cellulose acetate, cellulose acetate formate, cellulose acetate propionate, cellulose acetate butyrate, cellulose acetate pentanoate, cellulose acetate hexanoate, cellulose acetate heptanoate, cellulose acetate benzoate, cellulose acetate hydrogen phthalate, cellulose triacetate, and cellulose nitrate; vinyl-type resins like polyvinyl alcohol, polyvinyl acetate, polyvinyl butyral, polyvinyl pyrrolidone, polyvinyl acetoacetal, and polyacrylamide; polymers and copolymers derived from acrylates and acrylate derivatives, such as polyacrylic acid, polymethyl methacrylate, and styrene-acrylate copolymers; polyester resins; polycarbonates; poly(styrene-co-acrylonitrile); polysulfones; polyphenylene oxide; organosilicones such as polysiloxanes; epoxy resins and natural resins, such as gum arabic.

The binder resin can be added to the dye/binder layer in widely varying concentrations. In general, good results are obtained with 0.1 to 5 g of binder resin per m$^2$ of coated support.

The dye/binder layer comprises from 0.05 to 1 g of dye per m$^2$.

The dye/binder layer can also comprise other components such as e.g. curing agents, preservatives, and other ingredients, which have been described exhaustively in EP-A 0,133,011, EP-A 0,133,012, EP-A 0,111,004, and EP-A 0,279,467.

Any material can be used as the support for the dye-donor element provided it is dimensionally stable and capable of withstanding the temperatures involved, i.e. up to 400° C. over a period of up to 20 msec, and is yet thin enough to transmit heat supplied to one side through to the dye on the other side to effect transfer to the receiver sheet within such short periods, typically from 1 to 10 msec. Such materials include polyesters such as polyethylene therephthalate, polyamides, polyacrylates, polycarbonates, cellulose esters, fluorinated polymers, polyethers, polyacetals, polyolefins, polyimides, glassine paper, and condenser paper. Preference is given to a support comprising polyethylene terephthalate. In general, the support has a thickness of 2 to 30 $\mu$m. If desired, the support can be coated with an adhesive or subbing layer.

The dye/binder layer of the dye-donor element can be applied to the support by coating or by printing techniques such as a gravure process.

A dye barrier layer comprising a hydrophilic polymer can be provided between the support and the dye/binder layer of the dye-donor element to improve the dye transfer densities by preventing wrong-way transfer of dye into the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethylene imine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP-A 0,227,091 and EP-A 0,228,065. Certain hydrophilic polymers e.g. those described in EP-A 0,227,091 also have an adequate adhesion to the support and the dye/binder layer, thus eliminating the need for a separate adhesive or subbing layer. These particular hydrophilic polymers used in one single layer in the dye-donor element thus perform a dual function, hence are referred to as dye barrier/subbing layers.

Preferably the reverse side of the dye-donor element can be coated with a slipping layer to prevent the printing head from sticking to the dye-donor element. Such a slipping layer would comprise a lubricating material such as a surface-active agent, a liquid lubricant, a solid lubricant, or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, and fluoroalkyl $C_2$–$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid esters. Suitable slipping layers have been described in e.g. EP-A 0,138,483, EP-A 0,227,090, US-A 4,567,113, U.S. Pat. No. 4,572,860, and U.S. Pat. No. 4,717,711.

The dye-donor element can be used in sheet form or in the form of a continuous roll or ribbon.

The support of the receiver sheet to be used in combination with the dye-donor element may be a transparent film of e.g. polyethylene terephthalate, a polyether sulfone, a polyimide, a cellulose ester, and a polyvinyl alcohol-coacetal. The support may also be a reflecting one such as e.g. baryta-coated paper, polyethylene-coated paper, and white polyester i.e. white-pigmented polyester.

To avoid poor adsorption of the transferred dye to the support of the receiver sheet, this support must be coated with a special surface, generally known as dye-image-receiving layer, into which the dye can diffuse more readily. The dye image-receiving layer may comprise e.g. a polycarbonate, a polyurethane, a polyester, a polyamide, polyvinyl chloride, polystyrene-coacrylonitrile, polycaprolactone, and mixtures thereof. Suitable dye-image-receiving layers have been described in e.g. EP-A 0,133,011, EP-A 0,133,012, EP-A 0,144,247, EP-A 0,227,094, and EP-A 0,228,066.

UV-absorbers and/or antioxidants may be incorporated into the dye-image-receiving layer for improving the fastness to light and other stabilities of the recorded images.

It is generally known to use a releasing agent that aids in separating the receiver sheet from the dye-donor element after transfer. Solid waxes, fluorine- or phosphate-containing surfactants, and silicone oils can be used as releasing agent. A suitable releasing agent has been described in e.g. EP-A 0,133,012, JP 85/19138, and EP-A 0,227,090.

The dye-donor elements according to the present invention are used to form a dye transfer image. Such a process comprises placing the dye layer of the dye-donor element in face-to-face relation with the dye-receiving layer of the receiver sheet and image-wise heating from the back of the donor element. The transfer of the dye is accomplished by heating for milliseconds at a temperature that may be as high as 400° C.

When the dye transfer is performed for but one single colour, a monochrome magenta dye transfer image is obtained, which consists of at least one dye according to the present invention. A multicolour image can be obtained by using a dye-donor element containing three or more primary colour dyes, one of which may consist of at least one yellow dye, another one of which may consist of at least one magenta dye according to the present invention, and one cyan dye and sequentially performing the process steps described above for each colour. The above sandwich of dye-donor element and receiver sheet is then formed on three or more occasions during the time heat is being supplied by the thermal printing head. After the first dye has been transferred, the elements are peeled apart. A second dye-donor element or another area of the dye-donor element with a different dye area is then brought in register with the receiver sheet and the process is repeated. The third colour and optionally further colours are obtained in the same manner.

In addition to thermal printing heads, laser light, infrared flash, or heated pins can be used as a heat source for supplying the heat energy. Thermal printing heads that can be used to transfer dye from the dye-donor elements of the present invention to a receiver sheet are commercially available. Suitable thermal printing heads are e.g. a Fujitsu Thermal Head (FTP-040 MCS001), a TDK Thermal Head F415 HH7-1089, and a Rohm Thermal Head KE 2008-F3.

The following examples illustrate the present invention without limiting, however, the scope thereof.

EXAMPLE

A dye-donor element for use according to thermal dye sublimation transfer was prepared as follows.

To avoid sticking of the dye-donor element to the thermal printing head the rear side of a 5 μm polyethylene terephthalate support was provided first with a solution for forming a slipping layer, said solution comprising 10 g of co(styrene/acrylonitrile) comprising 104 styrene units and 53 acrylonitrile units, which copolymer is sold under the trade mark LURAN 378 P by BASF AG, D-6700 Ludwigshafen, West Germany, 10 g of a 1% solution of polysiloxane polyether copolymer sold under the trade mark TEGOGLIDE 410 by TH. GOLDSCHMIDT AG, D-4300 Essen 1, Goldschmidtstrasse 100, West Germany, and sufficient ethyl methyl ketone solvent to adjust the weight of the solution to a total of 100 g. From this solution a layer having a wet thickness of 15 μm was printed by means of a gravure press. The resulting layer was dried by evaporation of the solvent.

An amount of dye as identified in Table 5 hereinafter and a binder resin in an amount, both as defined in the same Table 5, were dissolved in 10 ml of solvent as defined in the same Table 5. The resulting ink-like composition was coated by means of a doctor knife on the front side of the polyethylene terephthalate support at a wet layer thickness of 100 μm and dried.

A commercially available Hitachi material (VY-S100A-paper ink set) was used as receiver sheet.

The dye-donor element was printed in combination with the receiver sheet in a Hitachi colour video printer VY-100A.

The receiver sheet was separated from the dye-donor element and the maximum colour density (Dmax) of the recorded dye image on the receiver sheet was measured in transmission by means of a Macbeth densitometer RD919 in Status A mode.

The stability to light of the dyes was tested as follows. The receiver sheet carrying transferred dye was divided into 3 strips. The first strip was exposed for 5 h, the second for 15 h, and the third for 30 h to white light and ultraviolet radiation in a XENOTEST (trade name) type 50 apparatus of Hanau Quartzlampen GmbH, Hanau, W. Germany. The density was measured again and the loss in density in percent was derived.

These experiments and measurements were repeated for each of the dye/binder combinations identified in Table 5. The results obtained are listed therein.

TABLE 5

| Dye | Binder | dye/binder mg/mg | solvent | Dmax | % Density loss 5 h | 15 h | 30 h | Spectral absorption red | green | blue |
|---|---|---|---|---|---|---|---|---|---|---|
| 1.1 | CAB | 50/50 | MEK | 1.93 | 8 | 33 | 70 | 11 | 150 | 56 |
| 1.1 | CN | 50/20 | MEK | 2.30 | 5 | 29 | 27 | 11 | 150 | 57 |
| 1.2 | CAB | 50/50 | THF | 1.63 | 4 | 29 | 64 | 11 | 150 | 65 |
| 1.2 | CN | 50/20 | THF | 2.05 | 5 | 31 | 68 | 11 | 150 | 62 |
| 1.3 | CAB | 50/50 | THF | 1.76 | 7 | 32 | 64 | 11 | 150 | 69 |
| 1.3 | CN | 50/20 | THF | 1.93 | 6 | 32 | 69 | 11 | 150 | 63 |
| 1.4 | CAB | 50/50 | MEK | 1.33 | 49 | 80 |  | 10 | 133 | 56 |
| 1.4 | SAN | 50/50 | MEK | 1.60 | 48 | 81 |  | 11 | 150 | 58 |
| 1.5 | CAB | 50/50 | MEK | 1.77 | 12 | 45 | 72 | 10 | 150 | 53 |
| 1.5 | SAN | 50/50 | MEK | 1.92 | 9 | 36 | 67 | 11 | 150 | 53 |
| 1.6 | CAB | 50/50 | MEK | 1.70 | 13 | 41 | 68 | 10 | 150 | 56 |
| 1.6 | SAN | 50/50 | MEK | 1.80 | 12 | 39 | 69 | 11 | 150 | 54 |

TABLE 5-continued

| Dye | Binder | dye/binder mg/mg | solvent | Dmax | % 5 h | Density loss 15 h | 30 h | Spectral absorption red | green | blue |
|---|---|---|---|---|---|---|---|---|---|---|
| I.7 | CAB | 50/50 | MEK | 1.83 | 7 | 27 | 59 | 10 | 150 | 54 |
| I.7 | SAN | 50/50 | MEK | 2.05 | 3 | 23 | 55 | 10 | 150 | 53 |
| I.8 | SAN | 50/50 | MEK | 1.21 | | | | 10 | 121 | 47 |
| I.9 | CAB | 50/50 | MEK | 1.57 | 6 | 26 | 59 | 9 | 150 | 53 |
| I.9 | SAN | 50/50 | MEK | 1.91 | 6 | 27 | 61 | 9 | 150 | 53 |
| II.1 | CAB | 50/50 | MEK | 1.64 | 0 | 2 | 14 | 19 | 150 | 56 |
| II.1 | SAN | 50/50 | MEK | 2.21 | 2 | 11 | 31 | 18 | 150 | 57 |
| II.2 | CAB | 50/50 | MEK | 1.77 | 6 | 19 | 51 | 18 | 150 | 54 |
| II.2 | SAN | 50/50 | MEK | 1.87 | 6 | 22 | 57 | 18 | 150 | 54 |
| II.3 | CAB | 50/50 | MEK | 1.71 | 3 | 17 | 40 | 17 | 150 | 57 |
| II.3 | SAN | 50/50 | MEK | 2.06 | 1 | 16 | 44 | 16 | 150 | 55 |
| II.4 | CAB | 50/50 | MEK | 1.63 | 3 | 17 | 45 | 13 | 150 | 49 |
| II.4 | SAN | 50/50 | MEK | 1.99 | 5 | 19 | 48 | 13 | 150 | 48 |
| II.5 | CAB | 50/50 | MEK | 1.52 | 3 | 5 | 26 | 19 | 150 | 63 |
| II.5 | SAN | 50/50 | MEK | 1.95 | 5 | 15 | 44 | 17 | 150 | 55 |
| II.6 | CAB | 50/50 | MEK | 1.51 | 0 | 4 | 34 | 20 | 150 | 68 |
| II.6 | SAN | 50/50 | MEK | 1.99 | 5 | 17 | 45 | 18 | 150 | 58 |
| III.1 | CAB | 50/50 | MEK | 2.06 | 5 | 21 | | 11 | 150 | 53 |
| III.2 | CAB | 50/50 | MEK | 2.69 | 3 | 10 | | 13 | 150 | 57 |

In the above Table
THF stands for tetrahydrofuran;
MEK stands for methyl ethyl ketone;
CAB stands for cellulose acetate butyrate having an acetyl content of 29.5% and a butyryl content of 17% (Tg 161° C.; melting range 230°-240° C.);
CN stands for cellulose nitrate;
SAN stands for co-styrene acrylonitrile.

COMPARATIVE EXAMPLE

A dye-donor element was prepared as described hereinbefore using as dye Resolin Rot F3BS (compound a as defined above) instead of one of the present dyes. Resolin Rot F3BS corresponds to the dyes described in DP 86/227092 having an alkylsulfonylamino substituent.

Due to the fact that the maximum solubility of this dye in methyl ethyl ketone is 4.5% a maximum dye/binder ratio of 13.3/50 can only be obtained for gravure printing. With this maximum dye/binder ratio corresponds a maximum density of 1.10, thus considerably smaller than the densities obtained when using the present dyes (cfr. the results for dyes I.1–I.9 listed in Table 5 above).

We claim:

1. Dye-donor element for use according to thermal dye transfer methods, said element comprising a support having thereon a dye/binder layer comprising a dye carried by a polymeric binder resin, said dye corresponding to the following general formula

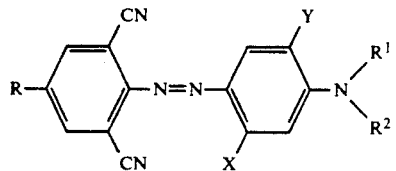

wherein
R represents a hydrogen atom, a $C_1$–$C_8$ alkyl group, a $C_1$–$C_8$ alkoxy group, a $C_3$–$C_8$ alkoxyalkyl group or a halogen atom;
$R^1$ and $R^2$ independently represent a $C_1$–$C_8$ alkyl group, a substituted $C_1$–$C_8$ alkyl group, a cycloalkyl group, a substituted cycloalkyl group, an aryl group, a substituted aryl group, or $R^1$ and $R^2$ together represent the atoms necessary for completing a heterocyclic nucleus or substituted heterocyclic nucleus, or $R^1$ and/or $R^2$ together with Y represent the atoms necessary for completing a fused-on heterocyclic nucleus or substituted fused-on heterocyclic nucleus;
Y represents a hydrogen atom, a methyl group, a halogen atom, a $C_1$–$C_4$ alkoxy group, or Y together with $R^1$ and/or $R^2$ represent the atoms necessary for completing a fused-on heterocyclic nucleus or substituted fused-on heterocyclic nucleus;
X represents a substituted or unsubstituted arylsulfonylamino group, a substituted or unsubstituted arylcarbonylamino group or a substituted or unsubstituted phosphorylamino group.

2. A dye-donor element according to claim 1, wherein R, $R^1$ and $R^2$ independently represent an alkyl group and Y represents hydrogen.

3. A dye-donor element according to claim 1, wherein X corresponds to

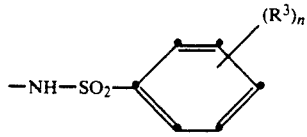

wherein
$R^3$ represents hydrogen, halogen, cyano, nitro, a substituted or unsubstituted alkyl or alkoxy group having from 1 to 10 carbon atoms, a cycloalkyl group having from 5 to 7 carbon atoms, a substituted or unsubstituted aryl or aryloxy group having from 6 to 10 carbon atoms, unsubstituted aryl or aryloxy group having from 6 to 10 carbon atoms, alkyl- or arylcarbonyl, alkyl- or arylthio, alkyl- or arylsulfonyl, alkyl- or aryloxycarbonyl, alkyl- or arylaminocarbonyl, alkyl- or arylcarbonylamino, alkyl- or arylsulfonylamino;
n represents an integer from 0 to 5.

4. A dye-donor element according to claim 3, wherein $R^3$ represents alkyl, nitro, halogan or alkylcarbonylamino and n represents 0, 1 or 2.

5. A dye-donor element according to claim 1, wherein X corresponds to

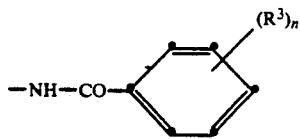

wherein
R³ represents hydrogen, halogen, cyano, nitro, a substituted or unsubstituted alkyl or alkoxy group having from 1 to 10 carbon atoms, a cycloalkyl group having from 5 to 7 carbon atoms, a substituted or unsubstituted aryl or aryloxy group having from 6 to 10 carbon atoms, alkyl- or arylcarbonyl, alkyl- or arylthio, alkyl- or arylsulfonyl, alkyl- or aryloxycarbonyl, alkyl- or arylaminocarbonyl, alkyl- or arylcarbonylamino, alkyl- or arylsulfonylamino;

n represents an integer from 0 to 5.

6. A dye-donor element according to claim 5, wherein R³ represents alkyl, nitro, halogen or alkoxy and n represents 0 or 1.

7. A dye-donor element according to claim 1, wherein X corresponds to

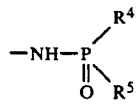

wherein R⁴ and R⁵ independently represent a substituted or unsubstituted alkyl or aryl group, a substituted or unsubstituted alkoxy or aryloxy group, a substituted or unsubstituted amino group.

8. A dye-donor element according to claim 1, wherein the polymeric binder resin is cellulose acetate butyrate or cellulose nitrate or co-styrene acrylonitrile.

9. A dye-donor element according to claim 1, wherein said support comprises polyethylene terephthalate.

10. A dye corresponding to the following general formula

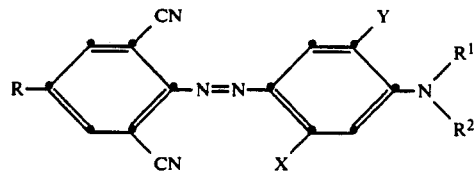

wherein
R represents a hydrogen atom, a $C_1$-$C_8$ alkyl group, a $C_1$-$C_8$ alkoxy group, a $C_3$-$C_8$ alkoxyalkyl group or a halogen atom;

R¹ and R² independently represent a $C_1$-$C_8$ alkyl group, a substituted $C_1$-$C_8$ alkyl group, a cycloalkyl group, a substituted cycloalkyl group, an aryl group, a substituted aryl group, or R¹ and R² together represent the atoms necessary for completing a heterocyclic nucleus or substituted heterocyclic nucleus, or R¹ and/or R² together with Y represent the atoms necessary for completing a fused-on heterocyclic nucleus or substituted fused-on heterocyclic nucleus;

Y represents a hydrogen atom, a methyl group, a halogen atom, a $C_1$-$C_4$ alkoxy group, or Y together with R¹ and/or R² represent the atoms necessary for completing a fused-on heterocyclic nucleus or substituted fused-on heterocyclic nucleus;

X represents a substituted or unsubstituted arylsulfonylamino group, a substituted or unsubstituted arylcarbonylamino group or a substituted or unsubstituted phosphorylamino group.

* * * * *